3,332,901
CATIONIC WATER-SOLUBLE POLYAMIDE-EPICHLOROHYDRIN RESINS AND METHOD OF PREPARING SAME

Gerald I. Keim, West Grove, Pa., assignor to Hercules Incorporated, Wilmington, Del., a corporation of Delaware
No Drawing. Continuation of application Ser. No. 510,943, Dec. 1, 1965, which is a continuation of application Ser. No. 282,579, May 23, 1963. This application June 16, 1966, Ser. No. 557,914
10 Claims. (Cl. 260—29.2)

This application is a continuation of application Ser. No. 510,943, filed Dec. 1, 1965, now abandoned, which application is a continuation of application Ser. No. 282,579, filed May 23, 1963, now abandoned, which application is a continuation-in-part of application Ser. No. 850,762, filed Nov. 4, 1959, now abandoned, which is a continuation-in-part of application Ser. No. 682,089, filed Sept. 5, 1957, now abandoned.

This invention relates to cationic thermosetting polyamide-epichlorohydrin resins and to a method of preparing same.

Very efficient, alkaline-curing, wet-strength resins for paper may be prepared by reacting epichlorohydrin with basic polyamides whose basicity is essentially due to the presence of secondary amino groups. However, due to the relatively slow rate of cure of these resins, paper containing same develops wet strength slowly on the paper machine and also during storage. Moreover, these resins are stabilized by adjusting the pH below 7.0.

It has now been discovered that fast-curing, efficient resins may be prepared by reacting epichlorohydrin with a basic polyamide whose basicity is essentially due to the presence of tertiary amino groups. When used for the wet strengthening of paper, these resins cure faster on the machine and in storage than do resins of the above referred to type whose basicity is essentially due to the presence of secondary amino groups. The new resins, moreover, are stable at a pH range around neutrality, thereby eliminating, or at least substantially reducing, the corrosion problems encountered in the handling and storage of acid pH solutions.

Having described the invention generally, the following examples are given to illustrate specific embodiments thereof.

Example 1

Two hundred ninety grams (2.0 moles) of methyl bis-(3-aminopropyl)amine and 100 ml. of water were weighed into a round-bottom, 3-necked flask equipped with a thermometer, mechanical stirrer and a take-off condenser. The agitator was started and 290 grams (2.0 moles) of adipic acid was added in 6 equal parts over a period of 10 minutes. The charge was heated to 165° C. and held there for 24 hours, cooled to 75° C. and 400 ml. of water was added. The product was then cooled to 25° C. and bottled. The product had a solids content of 64.9% and an intrinsic viscosity (measured in a 1.0 normal $NH_4Cl$ solution) of 0.140.

Ninety-seven grams of this polyamide solution was dissolved in 450.0 grams of water and transferred to a 3-necked, round-bottom flask equipped with thermometer, mechanical agitator and dropping funnel. The agitator was started and the charge was heated to 50° C. Twenty-four grams of epichlorohydrin (1.05 moles of epichlorohydrin per mole of tertiary amine in the polyamide) was added dropwise over a period of 10 minutes. The temperature was raised to 60° C. and maintained between 60 and 70° C. until the viscosity of the resin reached E (Gardner scale at 25° C.). The reaction was then terminated by adding 300 ml. of water and 10 ml. of 10% $H_2SO_4$. The heating mantle was removed and the product was cooled to 25° C. The product had a pH of 4.9, 9.0% solids and a viscosity of 28 cps. (Brookfield). After standing overnight, the product had a pH of 8.2. It was stable at 25° C. for more than 5 months.

Example 2

Three hundred grams (2.07 moles) of methyl bis(3-aminopropyl)amine and 100 grams of water were weighed into a glass autoclave equipped with thermometer, mechanical stirrer and distillation condenser. The agitator was started and 290 grams (2.0 moles) of adipic acid was added in 6 equal portions over a period of 10 minutes. During this addition, the pot temperature was from 50° C. to 98° C. Heat was applied to the autoclave and the temperature raised to 170° C. It was held between 170–177° C. for 4 hours. The charge was cooled to 140° C. and 400 grams of water was added after which it was cooled to 25° C. The product contained 57.8% solids. It had an intrinsic viscosity of 0.132, an acid number of 10.3 and a tertiary amine content, calculated as triethylamine, of 2.9%.

Two hundred eighteen grams of this polyamide solution and 460.0 grams of water were weighed into a 3-necked, round-bottom flask equipped with mechanical stirrer, thermometer and dropping funnel. The charge was heated to 50° C. and 62.0 grams of epichlorohydrin (1.37 moles of epichlorohydrin per mole of tertiary amine in the polyamide) was added dropwise over a period of 3 minutes. The flask was then heated at 60–64° C. and held there until the viscosity of a 25% solids solution of the resin reached D (Gardner scale of 25° C.). The resin was then cooled rapidly to 25° C. and the pH adjusted from 9.0 to 8.0 with 1 drop of concentrated sulfuric acid. The product contained 24.5% solids and had a viscosity of 65 cps. (Brookfield).

Example 3

Forty-eight and one-half grams of the polyamide utilized in Example 1 and 225.0 grams of water were weighed into a 3-necked, round-bottom flask equipped with stirrer, thermometer and dropping funnel. The charge was heated to 50° C. and 14.0 grams of epichlorohydrin (1.22 moles of epichlorohydrin per mole of tertiary amine in the polyamide) was added dropwise over a period of 3 minutes. The flask was then heated to 70° C. and maintained between 60–70° C. until the viscosity of the resin reached 0 (Gardner scale at 25° C.). In order to stop the reaction, 150 ml. of water was added and the resin was cooled to 25° C. The product contained 7.7% solids and had a pH of 8.0 and a viscosity of 96.5 cps. (Brookfield).

Example 4

A polyamide-epichlorohydrin resin was prepared as follows: 225 parts of diethylenetriamine and 108 parts of water were placed in a reaction vessel and agitated. To this was added 327 parts of adipic acid. After the acid had dissolved in the amine, the solution was heated to 165–170° C. and held there until the reaction was completed. Then 503 parts of water was added. The resulting polyamide solution contained about 51.0% solids and had an intrinsic viscosity at 25° C. of about 0.120.

To 100 parts of this polyamide solution was added about 395 parts of water. This solution was heated to 50° C. and 25.5 parts of epichlorohydrin was added. The mixture was then heated to about 70° C. until it had obtained a viscosity of D–E (Gardner scale at 25° C. and 14.5% solids). Then 181.8 parts of water was added to the product, it was cooled to 25° C.–30° C. and sufficient 10% HCl added to adjust the pH to about 5.0 The product contained about 10% solids and had a Gardner viscosity at 25° C. of C–D.

The polyamide-epichlorohydrin resins of Examples 1, 2 and 3 were each evaluated in paper in comparison with the polyamide-epichlorohydrin resin, prepared as above described, as a control. Tacoma bleached kraft pulp was beaten in a Noble and Wood cycle beater to a Schopper-Riegler freeness of 750 cc. The resins were added to the dilute stock in the proportioner of a Noble and Wood handsheet machine. The stock was formed into handsheets with a basis weight of 40 lb./ream and dried on a laboratory drum drier to a moisture content of 5%. Part of each set of handsheets was given an additional cure of 1 hour at 105° C. The wet tensile strength of the paper was measured after soaking in distilled water for 2 hours at 25° C. Results are given in Table I below.

TABLE I

| Resin Sample | Percent Resin Added Based on Dry Pulp Weight | Wet Tensile, lb./in. | Cured Wet Tensile, lb./in. |
| --- | --- | --- | --- |
| Example 1 | 0.4 | 5.6 | 7.0 |
|  | 1.0 | 8.6 | 10.3 |
| Control | 0.4 | 4.6 | 7.6 |
|  | 1.0 | 6.9 | 10.3 |
| From Example 2 | 0.4 | 5.7 | 8.1 |
|  | 1.0 | 8.2 | 11.4 |
| Control | 0.4 | 4.7 | 8.5 |
|  | 1.0 | 6.2 | 11.3 |
| From Example 3 | 0.4 | 5.1 | 7.1 |
|  | 1.0 | 7.6 | 9.8 |
| Control | 0.4 | 4.5 | 8.4 |
|  | 1.0 | 6.7 | 11.8 |

*Example 5*

A resin similar to the polyamide-epichlorohydrin resin of Example 1 was divided into 3 parts and adjusted to pH 7.0, 5.0, and 2.0, respectively. The latter sample gelled in 5 days. The pH of the first two samples was checked after 5 days and found to be 8.65 and 8.50 respectively. The sample initially adjusted to pH 5.0 gelled in 4 months while the sample adjusted to pH 7.0 was still quite fluid. It is thus apparent that reducing the pH substantially below 7, even for a few days, decreases the shelf life of these resins.

*Example 6*

Two hundred and ninety grams (2 moles) of methyl bis(3-aminopropyl)amine was weighed into a three-necked, round-bottom flask equipped with thermometer, mechanical stirrer, and condenser. The agitator was started and 268 grams (2 moles) of diglycolic acid was added. The charge was slowly heated to 160° C. After two hours at 160° C., 66.5 ml. of water had been distilled off. The charge was cooled to 140° C. and 400 ml. of water was added and the solution was cooled to room temperature. It contained 56.5% solids.

Forty-three grams of the above polyamide and 200 g. of water were weighed into a three-necked, round-bottom flask equipped with stirrer, thermometer and dropping funnel. The agitator was started and the contents of the flask was heated to 50° C. By means of the dropping funnel, 9.5 g. of epichlorohydrin was added dropwise in two minutes. Then, the temperature of the reactants was raised to 65° C. and maintained between 60–70° C. until the viscosity of the product reached D (Gardner scale at 25° C.). The product was diluted with 150 ml. of water and cooled to 25° C. It had a pH of 8.2, a viscosity of B (Gardner), and contained 8.2% solids.

*Example 7*

Twenty-one and six-tenths grams (0.144 mole) of methyl bis(3-aminopropyl)amine and 10 grams of water were weighed into a small glass autoclave equipped with thermometer, mechanical stirrer and a condenser. The agitator was started and 26.0 g. (0.148 mole) of suberic acid was added. The autoclave was then slowly heated to 170° C. and maintained at 170–173° C. for four hours. Approximately 12.5 g. of distillate was collected during the reaction. The charge was cooled to 140° C. and dissolved in 40 g. of water. The product was an aqueous solution of a basic polyamide containing 53.2% solids.

Thirty-three grams of the above polyamide and 95.4 g. of water were weighed into a 250-ml., round-bottom, three-necked flask equipped with mechanical agitator and thermometer. The agitator was started, the charge was heated to 50° C. and 5.7 g. of epichlorohydrin (1 mole epichlorohydrin per mole of tertiary amine groups in polyamide) was added. The temperature of the solution was then raised to 65° C. and held between 65–70° C. until the viscosity of the resin reached H on the Gardner scale (measured at 25° C.). The polymerization was terminated by adding 325 g. of water. The final product was a clear, almost colorless solution with a pH of 8.6, a viscosity of >A and containing 4.6% solids.

*Example 8*

The resins produced in Examples 6 and 7 above were evaluated in bleached kraft pulp beaten to a Schopper-Riegler freeness of 750 cc. The resins were added to the pulp in the proportioner of a Noble and Wood handsheet machine at a pH of 7.5. The stock was formed into handsheets with a basis weight of 40 lb./ream. The handsheets were dried on a drum drier to a moisture content of 4%. A portion of the handsheets was given an additional cure of one hour at 105° C. The wet tensile tests were done on 1-inch strips of the paper which had been soaked for two hours in distilled water. The results are given in the Table II below.

TABLE II

| Resin Sample | Percent Resin Added Based on Bone Dry Pulp | Basis Weight of Handsheets, lb. | Dry Tensile, lbs./in. | Wet Tensile, lbs./in. | Wet Tensile, Cured, lbs./in. |
| --- | --- | --- | --- | --- | --- |
| From Example 6 | 0.5 | 40 | 26 | 3.6 | 4.6 |
|  | 1.0 | 40 | 26 | 4.7 | 6.2 |
| From Example 7 | 0.5 | 40 | 26 | 5.5 | 7.6 |
|  | 1.0 | 40 | 26 | 6.9 | 9.4 |

The basic polyamides contemplated for use in the preparation of the improved cationic thermosetting resins of the present invention are those whose basicity is due primarily to the presence of tertiary amino groups. They may also contain smaller quantities of either primary and/or secondary amino groups and/or quaternary ammonium groups. However, tertiary amino groups should account for at least 70% of the basic nitrogen groups present in the polyamide.

These basic polyamides may be prepared by reacting a polyamine containing at least three amino groups, at least one of which is a tertiary amino group, e.g., two primary amino groups and at least one tertiary amino group with a saturated aliphatic dicarboxylic acid such as adipic acid and suberic acid, or with diglycolic acid. Blends of two or more of these dicarboxylic acids may also be used, as well as blends of one or more of these with higher saturated aliphatic dicarboxylic acids as long as the resulting long-chain polyamide is water-soluble or at least water-dispersible.

The polyamine reactant should have at least three amino groups, at least one of which is a tertiary amino group. It may also have secondary amino groups in limited amounts. Typical polyamines of this type suitable for use as hereinabove described are methyl bis(3-aminopropyl)amine, methyl bis(2-aminoethyl)amine, N-(2-aminoethyl)piperazine, 4,7-dimethyltriethylenetetramine and so on.

The temperatures employed for carrying out the reaction between the dicarboxylic acid and the polyamine may vary from about 110° C. to about 250° C. or higher at atmospheric pressure. For most purposes, however, temperatures between about 160° C. and 210° C. have been found satisfactory and are preferred. Where reduced pressures are employed, somewhat lower temperatures may be utilized. The time of reaction depends on the temperatures and pressures used and will ordinarily vary from about 1 to about 4 hours, although shorter or longer reaction times may be utilized depending on reaction conditions. In any event, the reaction is desirably continued to substantial completion for best results.

In carrying out the reaction, it is preferred to use an amount of dicarboxylic acid sufficient to react substantially completely with the primary amine groups of the polyamine. This will usually require a mole ratio of polyamine to dicarboxylic acid of from about 0.9:1 to about 1.2:1 and preferably from about 0.92:1 to 1.14:1. However, mole ratios of from about 0.8:1 to about 1.4:1 may be used with quite satisfactory results. Mole ratios outside of these ranges are generally unsatisfactory. Thus, mole ratios below about 0.8:1 result in a gelled product or one having a pronounced tendency to gel while mole ratios above about 1.4:1 result in low molecular weight polyamides. Such products do not produce efficient wet-strength resins when reacted with epichlorohydrin.

Basic polyamides suitable for use herein may also be prepared from the long-chain polyamides described in my copending application Ser. No. 796,743 filed Mar. 3, 1959, now U.S. Patent No. 2,926,154 dated Feb. 23, 1960, by alkylating secondary amine groups of such long-chain polyamides to tertiary amine groups using alkyl halides, such as methylchloride and ethyl bromide, dimethyl sulfate, diazomethane, benzyl chloride or other suitable alkylating agent.

In converting the polyamide formed as above described to a cationic thermosetting resin, it is reacted with epichlorohydrin at a suitable temperature, i.e., at a temperature from about 25° C. to about 70° C., until the viscosity of the 20% solid solution at 25° C. has reached about C. or higher on the Gardener-Holdt scale. This reaction is preferably carried out in aqueous solution to moderate the reaction. The reaction may also be moderated by decreasing the pH of the aqueous polyamide solution with acid prior to addition of epichlorohydrin or immediately after the addition of epichlorohydrin. This adjustment is usually made to pH 8.5–9.5 but may be made to pH 7.5 in some cases with quite satisfactory results.

When the desired viscosity is reached, sufficient water is then added to adjust the solids content of the resin solution to about 25% or less, the product cooled to about 25° C. and then stabilized by adjusting the pH to about 7.0 to 9.0 and preferably to about 7.0 to 8.0. In some cases, pH adjustment will not be necessary at all since the final pH of the product will fall within the desired range.

In the polyamide-epichlorohydrin reaction, it is preferred to use sufficient epichlorohydrin to react with substantially all of the tertiary amine groups. However, more or less may be added to moderate or increase reaction rates. In general, it is contemplated utilizing from about 0.8 mole to about 2.0 moles of epichlorohydrin per mole of polyamide amine. It is preferred to utilize from about 1.0 mole to about 1.7 moles of epichlorohydrin per mole of polyamide amine.

The polyamide-epichlorohydrin resins, prepared as herein described, may be incorporated into pulp slurry at any point on the wet end of the paper machine. They may also be applied from a tub size or at a size press or form showers to the dry or partially dried sheet. For most purposes, adequate wet strength may be obtained by incorporating in the paper from about 0.25% to about 3% of the resin based on the dry weight of the pulp. However, in special cases up to 5% or more may be used.

It will thus be seen that the present invention provides polyamide-epichlorohydrin resins which are faster curing than previous resins of this type and which may be stabilized at pH's near neutrality thus reducing corrosion problems. While these resins have been described and exemplified in connection with their use as wet-strength resins for paper, they may also be used for various other purposes such as for insolubilizing water-soluble gums, as retention aids for such products as wax emulsions, ketene dimer emulsions and mineral fillers, as flocculating agents for pulp fines, clays and the like, and as an anchor coat to unite regenerated cellulose with a film such as nitrocellulose for reducing moisture vapor transmission of the cellulose film. While preferred embodiments of the invention have been described, the invention is not to be construed as limited thereby except as the same may be included in the following claims.

What I claim and desire to protect by Letters Patent is:

1. A process of preparing an aqueous solution of a cationic, water-soluble thermosetting resin which comprises (1) reacting by heating together at temperatures from about 40° C. to about 70° C. epichlorohydrin and an aliphatic long-chain basic water-soluble polyamide selected from the group consisting of (a) polyamides formed by reacting a polyalkylene polyamine having two primary amino groups and from one to three tertiary amino groups, with a dicarboxylic acid selected from the group consisting of adipic acid, suberic acid, and diglycolic acid in a mole ratio of polyalkylene polyamine to dicarboxylic acid of from about 0.8:1 to about 1.4:1 and (b) polyamides formed by reacting a polyalkylene polyamine having two primary amino groups and at least one secondary amino group with a dicarboxylic acid selected from the group consisting of adipic acid, suberic acid, and diglycolic acid, the mole ratio of polyalkylene polyamine to dicarboxylic acid being from about 0.8:1 to about 1.4:1 and reacting the polyamide with an alkylating agent to convert at least 70% of the secondary amino groups to tertiary amino groups, the basicity of said polyamide being due essentially to the presence of tertiary amino groups, said tertiary amino groups constituting at least 70% of the basic nitrogen groups present in the polyamide, and the mole ratio of epichlorohydrin to amino groups of said polyamide being from about 0.8:1 to about 2.0:1, (2) continuing the reaction until an aqueous solution of a water-soluble cationic thermosetting resin is formed, and then (3) terminating the reaction.

2. A process of preparing an aqueous solution of a cationic, water-soluble thermosetting resin which comprises (1) reacting by heating together at temperatures from about 40° C. to about 70° C. epichlorohydrin and an aliphatic long-chain basic water-soluble polyamide formed by reacting a polyalkylene polyamine having two primary amino groups and from one to three tertiary amino groups with a dicarboxylic acid selected from the group consisting of adipic acid, suberic acid, and diglycolic acid in a mole ratio of polyalkylene polyamine to dicarboxylic acid of from about 0.8:1 to about 1.4:1, the basicity of said polyamide being due essentially to the presence of tertiary amino groups, said tertiary amino groups constituting at least 70% of the basic nitrogen groups present in the polyamide, and the mole ratio of epichlorohydrin to amino groups of said polyamide being from about 0.8:1 to about 2.0:1, (2) continuing the reaction until an aqueous solution of a water-soluble cationic thermosetting resin is formed, and then (3) terminating the reaction.

3. A process of preparing an aqueous solution of a cationic, water-soluble thermosetting resin which comprises (1) reacting by heating together at temperatures from about 40° C. to about 70° C. epichlorohydrin and an aliphatic long-chain basic water soluble polyamide formed by reacting a polyalkylene polyamine having two primary amino groups and at least one secondary amino group with a dicarboxylic acid selected from the group consisting of adipic acid, suberic acid, and diglycolic acid, the mole ratio of polyalkylene polyamine to dicarboxylic acid being from about 0.8:1 to about 1.4:1, and reacting the polyamide with an alkylating agent to convert at least 70% of the secondary amino groups of said polyamide to tertiary amino groups, the basicity of said polyamide being due essentially to the presence of tertiary amino groups, said tertiary amino groups constituting at least 70% of the basic nitrogen groups present in the polyamide, and the mole ratio of epichlorohydrin to amino groups of said polyamide being from about 0.8:1 to about 2.0:1, (2) continuing the reaction until an aqueous solution of a water-soluble cationic thermosetting resin is formed, and then (3) terminating the reaction.

4. A process according to claim 2 in which the polyalkylene polyamine is methyl bis(3-aminopropyl)amine.

5. A process according to claim 4 in which the dicarboxylic acid is adipic acid.

6. A cationic water-soluble thermosetting resin produced by the proces of claim 1.

7. A cationic water-soluble thermosetting resin produced by the process of claim 2.

8. A cationic water-soluble thermosetting resin produced by the process of claim 3.

9. A cationic water-soluble thermosetting resin produced by the process of claim 4.

10. A cationic water-soluble thermosetting resin produced by the process of claim 5.

References Cited
UNITED STATES PATENTS

| 2,882,185 | 4/1959 | Valko et al. | 260—78 |
| 3,197,427 | 7/1965 | Schmalz | 260—29.2 |
| 3,215,654 | 11/1965 | Schmalz | 260—29.2 |

FOREIGN PATENTS 446,643 8/3/1942 Belgium.

MURRAY TILLMAN, *Primary Examiner.*

J. C. BLEUTGE, *Assistant Examiner.*